Feb. 17, 1931.　　　　J. PRIMROSE　　　　1,792,925
HEATING OIL AND SUPERHEATING STEAM
Filed Dec. 24, 1925
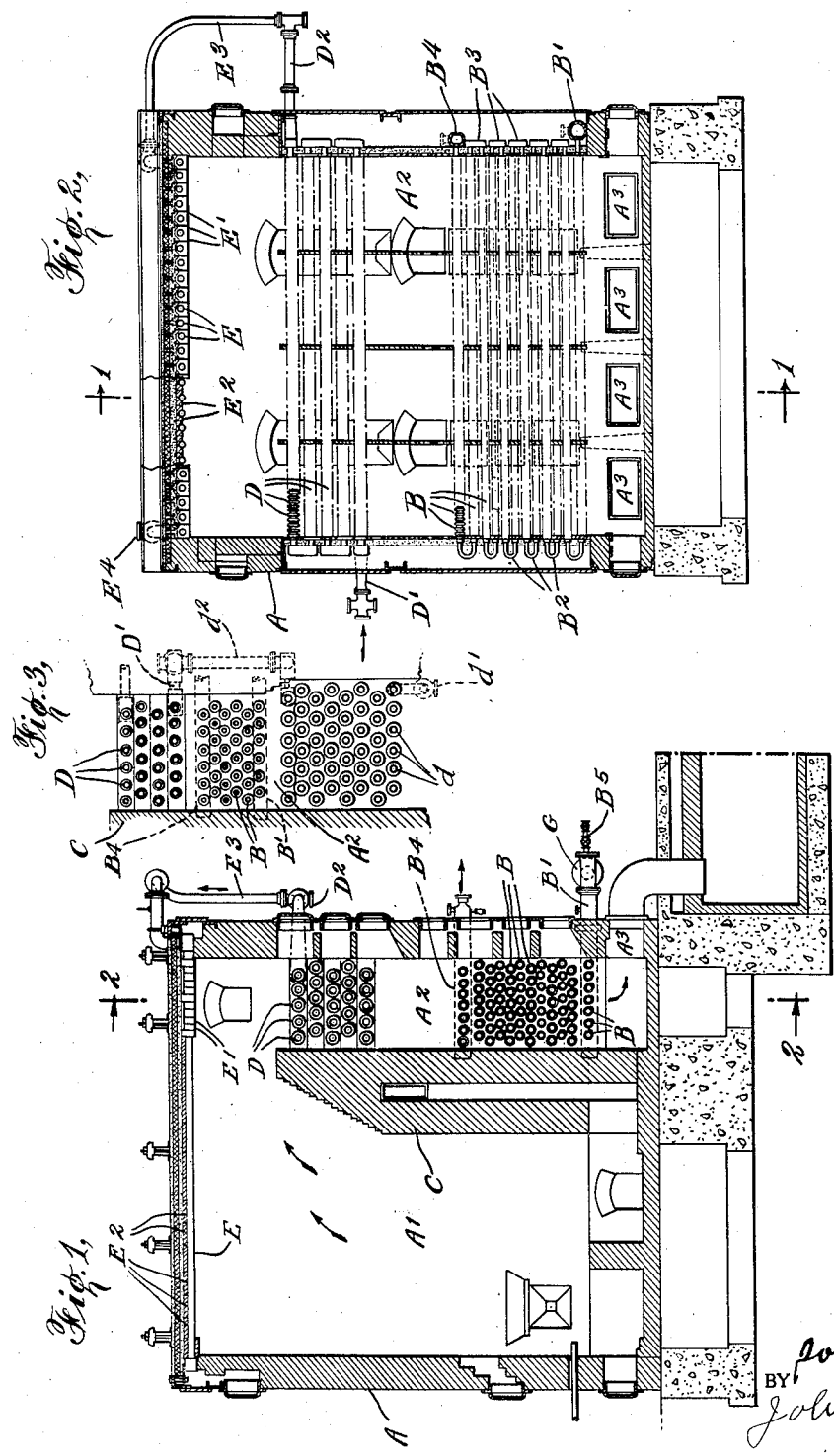
INVENTOR
John Primrose
BY
John E. Hubbell
ATTORNEY Patented Feb. 17, 1931

1,792,925

UNITED STATES PATENT OFFICE

JOHN PRIMROSE, OF RICHMOND, NEW YORK, ASSIGNOR TO FOSTER WHEELER CORPORATION, OF NEW YORK, N. Y., A CORPORATION OF NEW YORK

HEATING OIL AND SUPERHEATING STEAM

Application filed December 24, 1925. Serial No. 77,668.

The general object of the present invention is to provide an improved mode of conjointly heating oil and superheating steam with a desirably high thermal efficiency and by means of apparatus which is simple and effective, and which can be constructed in compact durable units of relatively large capacity, and of inherently low cost of construction. More specifically, the object of the invention is to provide a novel and desirable method of heating oil to a cracking temperature with little or no cracking of the oil, and simultaneously superheating steam to a high temperature. By the term "high temperature", as used in this connection, I mean a temperature which is in the neighborhood of 1000° F., or say from about 900° F. to 1250° F.

The extent to which an oil is actually cracked when heated to the cracking temperature involves a time element, and may be made wholly or largely negligible by reducing the time interval during which the oil absorbs heat after being brought to the cracking temperature. I utilize this principle in carrying out the present invention by passing the oil at relatively high velocity through the tubes of a tubular oil heater to which I supply heat at the rapid rate required to secure the heating effect desired notwithstanding the small period of time required for the passage of any particular particle of oil through the tubes. I thus supply heat to the oil heating tubes by locating them in a high temperature portion of the oil heater furnace so operated that the oil heating tubes will not cool the heating gases below a temperature which is several hundred degrees above that to which the heating gases are ordinarily cooled in passing over the tubes of oil heaters heretofore employed for heating oil to the cracking temperature. In practice the temperature to which I thus cool the heating gases by transferring heat therefrom to the oil heating tubes is preferably about 1500° F., which is but little below the maximum temperature at which the gases may be safely brought into contact with the tubes of the superheater in which, in accordance with the present invention, I utilize the available heat in the heating gases passing away from the oil heater tubes in superheating steam to a high temperature.

By proceeding in the manner described, the combination oil heating and steam superheating apparatus may be operated with a good thermal efficiency, since much of the heat of the heating gases leaving the oil heater section is absorbed in the steam superheating section. Furthermore, the apparatus may be operated at high capacity since in both the oil heating section and in the superheating section of the apparatus, the respective heating temperatures may be about as high as it is practically feasible or desirable to have them.

In superheating steam to a high temperature, there is a special advantage in bringing the heating gases initially into contact with the superheater tubes at a temperature but little, if any higher than the temperature of 1500° F. to which I appreciably cool the gases before they leave the oil heating section of the apparatus which I employ in carrying out my invention. In the operation of a superheater, the superheater tube walls ordinarily attain a temperature much higher than the nominal or average temperature to which the steam is superheated, and in superheating steam there is a tendency to internal corrosion of the superheater tubes when the latter are heated by contact with gases at too high a temperature. The temperature of a superheater tube at any point along its length is ordinarily intermediate the steam temperature within, and the gas temperature without the tube at that point, and is not necessarily or usually close to either the steam or the gas temperature. If the steam velocity through the tube, and the gas velocity over the tube were the same, the temperature of the tube wall would not differ much from the average of the steam and heating gas temperatures. Usually the steam velocity is substantially higher than the heating gas velocity, and the average super-heater tube wall temperature is consequently nearer to the average steam temperature than to the average heating gas temperatures, but capacity considerations ordinarily require a superheater to be operated under such conditions that the differential between the tube wall and average steam temperatures is a substantial one.

The internal corrosion to which superheater tubes are subject in superheating steam when the tubes are heated by contact with heating gases at too high temperatures is due, I believe, to the disassociation of some of the steam. The temperature at which all of the steam passing through the superheater would be disassociated is substantially above the temperature of from 900° to 1250° F. to which steam may advantageously be superheated by the use of the present invention, but I believe that in superheating steam, a certain small portion of the steam in immediate contact with the tube wall is heated to a temperature approximating that of the tube wall rather than the average temperature of the stream of steam passing through the tube, and that some local portions at least of the tube walls may be heated nearly to the temperature of the external heating gases.

The commercial utility and value of the invention is enhanced by the fact that the operation of certain oil refining plants requires that oil be heated to a cracking temperature with as little cracking of the oil as possible, and also require steam superheated to a high temperature. The high temperature to which steam is superheated in accordance with the present invention is not readily obtainable with a superheater forming an adjunct to, or a waste heat appliance of a boiler or other furnace such as is employed in superheating steam to the lower temperatures to which steam is commonly superheated, and it has been proposed to employ a separately fired superheater for the purpose. There are certain practical objections to the use of a separately fired superheater in superheating steam to any temperature except under certain special conditions, and these objections are augmented, of course, in superheating steam to a high temperature by the increased tendency to internal corrosion of the superheater tubes.

Those skilled in the art will readily understand that my improved method can be carried out in various ways and by means of apparatus varying greatly in type. In the accompanying drawings I have illustrated one form of apparatus well adapted for use in carrying out the present invention, but those skilled in the art will understand of course, that the invention may be practiced in different ways and by means of apparatus of varying forms.

Of the drawings:

Fig. 1 is a sectional elevation of an oil heating and steam superheating device the section being taken on the line 1—1 of Fig. 2;

Fig. 2 is a section taken on the line 2—2 of Fig. 1; and

Fig. 3 is a section taken similarly to Fig. 1, of a portion of a modified form of apparatus.

The drawings somewhat conventionally illustrate a heater A which differs from a tubular oil heater of a well known and standard type, only in that some of the oil heating tubes of the standard type of oil heater are replaced by a bank of superheating tubes B. The heater A comprises a combustion chamber A', and a tube containing heating chamber $A^2$. The chambers A' and $A^2$ are separated by a bridge wall C over the top of which the heating gases pass from the combustion chamber A' into the upper end of the chamber $A^2$ through which the heating gases pass to the heating gas outlet openings $A^3$. The oil heating section of the heater A comprises a bank of horizontally disposed tubes D located in the upper portion of the chamber $A^2$ and a row of tubes E which line the roof of the chambers A' and $A^2$. As shown, the tubes E extend transversely to the length of the bridge wall C, and have their portions directly above the chamber $A^2$ encased in cast metal blocks E', while the portions of the tubes E above the chamber A' and bridge wall C are exposed at their under sides and have their upper sides received in channels formed in the roof brick work $E^2$. The tubes D are surrounded by externally corrugated cast iron casing sections.

The oil to be heated passes through an inlet connection D' to one of the tubes D in the bottom row of said elements, and then passes back and forth first through one and then through another of the tubes D in the lowermost row of such tubes, and then passes similarly through the various tubes in the next row above, and so on until the oil reaches the outlet $D^2$ from the bank of tubes D. From the outlet $D^2$ the oil passes through a connection $E^3$ to the adjacent end of one of the roof tubes E, and then passes serially through the different tubes E to the heater oil outlet $E^4$.

The superheater tubes B are shown as similar to the well known Foster superheater tubes in that like the tube elements D each tube B is surrounded by tubular externally corrugated cast iron casing sections. The steam to be superheated is supplied through an inlet connection G to a superheated inlet header B' to which one end of each tube B in the lower row of said tubes is connected. Adjacent tubes B in the adjacent rows at the different levels are connected at one side of the heater A by return bends $B^2$, and at the opposite side of the heater by headers $B^3$. The steam after passing through the tubes B at the different levels, is withdrawn through the superheater outlet header $B^4$ to which one end of each tube B in the upper row of such elements is connected.

In the normal use contemplated of the apparatus shown in the drawings, fuel and air for its combustion are supplied to the combustion chamber A' as needed to satisfy the heat requirements of the heater. The fuel may be coal, but ordinarily is oil or gas, and the air for combustion may or may not be preheated. In any event, the combustion chamber temperature may be relatively high which tends both to high thermal efficiency and to high capacity. To that end, the combustion conditions may be made such as to make the temperature in the combustion chamber approximately as high as the combustion chamber walls will safely withstand. A considerable portion of the heat imparted to the oil is radiant heat absorbed by the tubes E. The additional heat imparted to the oil as the latter passes through the tubes D is absorbed by the latter from the heating gases passing over those tubes. The heating gases passing away from the bottom of the bank of tubes D heats the superheater tubes B in passing over the latter. The effectiveness of the tubes B and D is enhanced by the fact that these sections of the heater operate on the counter current principle, which is especially advantageous in the case of the superheater since it contributes appreciably to a desirably low heating gas exit temperature particularly as the temperature of the steam will ordinarily be several hundred degrees higher in the top row of tubes B than in the bottom row of these tubes.

The apparatus shown in the drawings was primarily devised for the purpose of heating oil from a temperature of about 650° F. at which the oil is supplied to the inlet D', to a temperature of about 750° F., as the oil passes through the tubes D and E, to the outlet E⁴, and for simultaneously superheating steam supplied to the superheater inlet header B' at ordinary boiler temperatures and pressures, to a temperature of about 1100° F. as the steam passes through the tubes B to the superheater outlet B⁴. It is to be understood, however, that the temperatures mentioned are given by way of example and not of limitation. Whatever the actual oil and steam temperatures may be, I prefer in general to so operate the heater that under normal conditions the temperature of the heating gases as they pass from the bottom of the bank of oil heating tubes D into the top of the bank of steam superheating tubes B, will be in the neighborhood of 1500° F., though the general advantages of the invention may be obtained in whole or in large part with some appreciable variation in the last mentioned temperature. An excessively high superheat temperature under conditions tending to produce such a temperature may be avoided by injecting spray of water into the superheater inlet header B' through the connection B⁵.

Where thermal efficiency considerations and conditions of use make it desirable and practically feasible to recover available heat in the heating gases passing away from the superheater, any usual or suitable waste heat recovery provisions may be added to the furnace. For example, with a furnace of the type shown in Figs. 1 and 2 employed in heating oil and superheating steam through the temperature ranges suggested above, it is sometimes desirable to utilize the heating gases passing downward away from the superheater tubes B in preheating the oil passing to the oil inlet D'. This is accomplished in the modified construction illustrated in Fig 3, by means of an oil preheater comprising a bank of tube elements d located in the chamber A² beneath the bank of superheater elements B. d' represents the preheater oil inlet connection, and d² a connection from the preheater outlet to the previously described inlet connection D'. The elements d may well be Foster elements similar to the elements D though advantageously as indicated in Fig. 3 the external tube casing ribs of the elements d are of greater diameter than the corresponding ribs of the elements D.

Having now described my invention, what I claim as new and desire to secure by Letters Patent, is:

1. The method of heating oil to a cracking temperature and superheating steam to a high temperature in a tubular oil heater having heating tubes absorbing radiant heat in a combustion chamber and a bank of tubes in a second chamber partly separated from said combustion chamber which comprises passing the oil through a portion of the tube bank and the radiant heat absorbing tubes at a velocity high enough to avoid or greatly minimize any cracking of the oil being heated, heating the oil containing tubes in said bank in substantial part by passing heating gases into contact with said tubes at such temperature and in such volume that the gases leaves said tubes at a temperature of about 1500° F. and superheating steam in the remaining portion of said tube bank to temperatures of or about 900° F. by contact with said high temperature gases.

2. The method of heating oil to a cracking temperature and superheating steam to a high temperature in a tubular oil heater having heating tubes absorbing radiant heat in a combustion chamber and a horizontally disposed tube bank in a second chamber partly separated from said combustion chamber which comprises passing the oil serially through a portion of the tube bank and the radiant heat absorbing tubes at a velocity high enough to avoid or greatly minimize any cracking of the oil being heated, heating the oil containing tubes in said bank mainly by passing heating gases into contact with said tubes at such temperature and in such volume that the gases leave said tubes at a temperature but little below the maximum at which they may contact with steam containing tubes without dissociating the steam and superheating steam in the remaining portion of said tube bank to temperatures of or above 900° F. by contact with said high temperature heating gases.

Signed at New York city, in the county of New York, and State of New York, this 18th day of December, A. D. 1925.

JOHN PRIMROSE.